United States Patent
Tang et al.

(10) Patent No.: US 10,461,841 B2
(45) Date of Patent: Oct. 29, 2019

(54) SATELLITE COMMUNICATION NETWORK TERMINAL INSTALLATION METHOD AND SYSTEM

(71) Applicant: Hughes Network Systems LLC, Germantown, MD (US)

(72) Inventors: Yeqing Tang, Gaithersburg, MD (US); David Whitefield, Gaithersburg, MD (US); Aniket Pugaonkar, Germantown, MD (US); Adam Axelrod, Bethesda, MD (US); Archana Gharpuray, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 317 days.

(21) Appl. No.: 15/281,845

(22) Filed: Sep. 30, 2016

(65) Prior Publication Data

US 2018/0097285 A1 Apr. 5, 2018

(51) Int. Cl.
*H01Q 3/00* (2006.01)
*H04B 7/185* (2006.01)

(52) U.S. Cl.
CPC .................. *H04B 7/185* (2013.01)

(58) Field of Classification Search
CPC .......... H04B 7/185; H01Q 1/288; H01Q 3/02; H01Q 3/08; H01Q 3/22
USPC ......................................................... 342/359
See application file for complete search history.

(56) References Cited

U.S. PATENT DOCUMENTS

| | | | | |
|---|---|---|---|---|
| 5,555,257 A | * | 9/1996 | Dent | H01Q 1/246 342/352 |
| 5,708,716 A | * | 1/1998 | Tisdale | H04B 7/18565 340/5.61 |
| 2005/0273822 A1 | * | 12/2005 | Snell | H04N 7/17336 725/64 |
| 2017/0272131 A1 | * | 9/2017 | Ananth | H04B 1/0475 |

* cited by examiner

*Primary Examiner* — Dao L Phan
(74) *Attorney, Agent, or Firm* — Global IP Counselors, LLP

(57) ABSTRACT

A method and system for installing a terrestrial antenna for a satellite communication network. In the system and method, a remote unit is provided to an installation location for the terrestrial antenna. The remote unit is configured to communicate with a satellite of the satellite communication network and includes a memory in which is stored antenna information pertaining to positioning of the terrestrial antenna with respect to a virtual beam generated by the satellite. The information is accessible by a code. Thus, the antenna information is access from the memory at the installation location using the code, and the terrestrial antenna in relation to a virtual beam generated by the satellite based on the antenna information accessed from the memory at the installation location.

8 Claims, 11 Drawing Sheets

| 1. INSTALL PARAMETER | 2. POINTING | 3. REGISTRATION |
|---|---|---|

⚙ RE-INSTALL

SBC STATE: 22.1.1 (WAITING FOR INSTALLATION PARAMETERS OR TERMINAL SWAP INFORMATION)

SERVICE INSTALLATION CODE  [ ZZZ ]

APPROXIMATE LATITUDE/LONGITUDE  19° 25.000000' N / 30° 59.000000' W

ANTENNA SIZE  [ 74 CM ▾ ]

[ NEXT ]

SATELLITE COMMUNICATION NETWORK TERMINAL INSTALLATION METHOD AND SYSTEM

BACKGROUND

Field of the Invention

The present invention generally relates to a satellite communication terminal installation method and system. More particularly, the present invention relates to a system and method for installing a satellite communication terminal at an end-user site without the need to obtain location information, such as GPS information, at the end-user site.

Background Information

Communication networks, such as satellite communication networks, employ satellite communication terminals at end-user sites which communicate with one or more satellites in the satellite communication network. As understood in the art, each satellite in the satellite communication network propagates at least one user beam onto a specific region of the earth. Also, each user beam typically includes a plurality of smaller sized virtual beams within the user beam. A satellite terminal includes a dish which, during installation, is pointed in the appropriate direction so that a virtual beam within the user beam is able to provide terminal location information which is accurate enough for the satellite terminal to close a link with the satellite as long as the satellite terminal is within the virtual beam coverage area as understood in the art. As also understood in the art, the size of the virtual beam (e.g., the number of the virtual beams in a user beam) will be determined by the timing error that is permissible in the system, which can be driven by, for example, customers' requirements as well as the link budget calculation.

In order to select an appropriate virtual beam, it is necessary for the specific location (i.e., longitude and latitude) of the satellite terminal to be known. When ordering an installation, a customer provides the installation location which can be as specific as the street address or even the GPS location information, or can be as general as simply the city or town name, or the postal code. Thus, in a typical installation process, the installer at the end-user site can use a location determining device, such as a global positioning system (GPS) device, Google Maps and so on, to determine the location of the satellite terminal if the customer only provided a street address or general information such as city and/or postal code. However, this process of obtaining location information complicates the overall installation process, and thus makes the installation process more time consuming. Furthermore, it is possible that in certain remote locations, such location information is difficult to obtain or unobtainable, which further complicates the process.

SUMMARY

In order to address these issues, the disclosed embodiments provide a method and system for installing a terrestrial antenna for a satellite communication network. In the system and method, a remote unit is provided to an installation location for the terrestrial antenna. The remote unit is configured to communicate with a satellite of the satellite communication network, and includes a memory in which is stored antenna information pertaining to positioning of the terrestrial antenna with respect to a virtual beam generated by the satellite. The information is accessible by a code. Thus, the antenna information is accessed from the memory at the installation location using the code, and the terrestrial antenna is positioned in relation to a virtual beam generated by the satellite based on the antenna information accessed from the memory at the installation location.

BRIEF DESCRIPTION OF THE DRAWINGS

Referring now to the attached drawings which form a part of this original disclosure:

FIG. 9 illustrates an example of a display screen for entering information during the on-site terminal installation phase as shown in FIGS. 2, 7 and 8.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
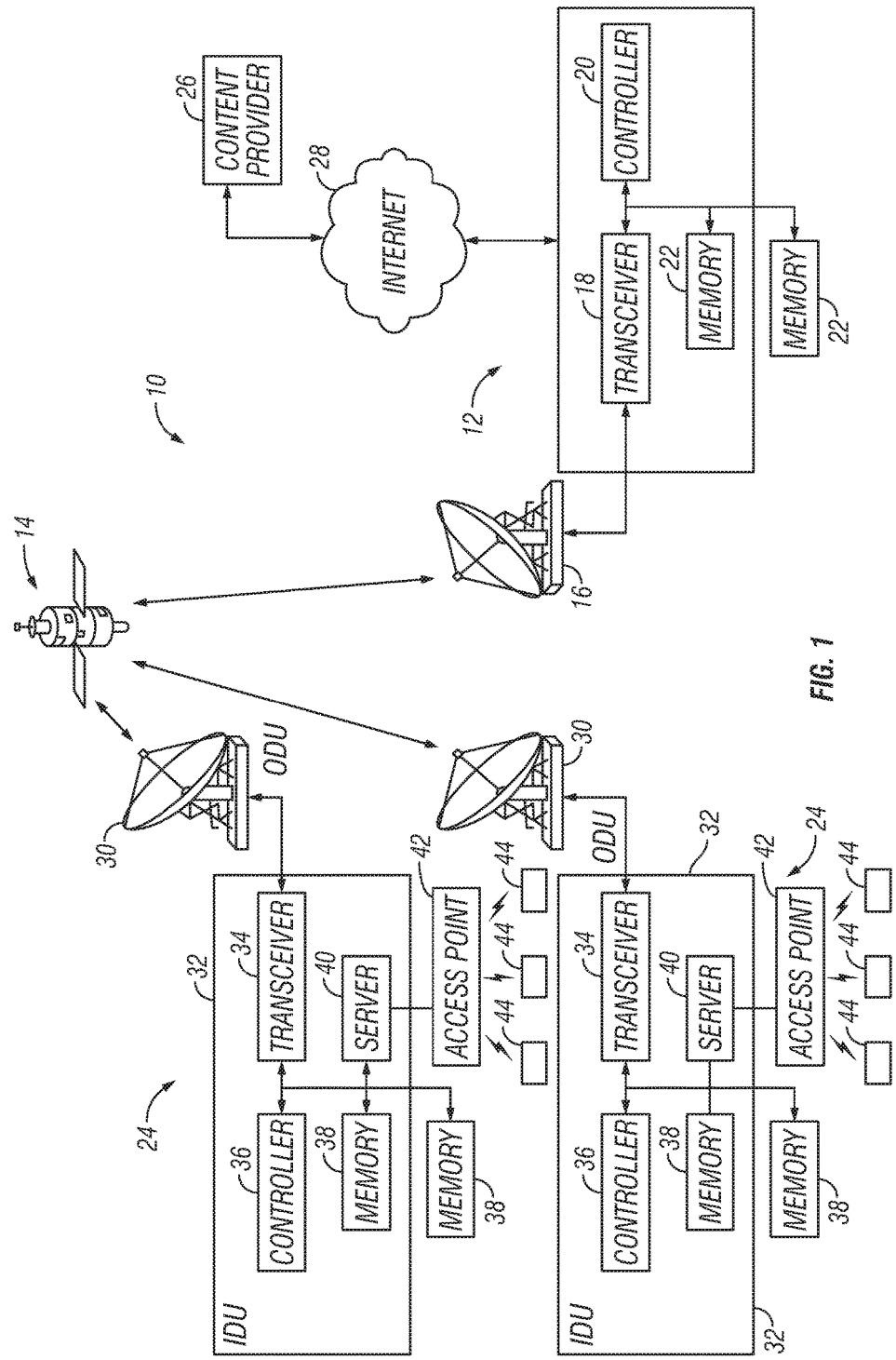
FIG. 1 illustrates an example of a satellite communication network according to a disclosed embodiment.

FIG. 1 illustrates an example of a satellite communication network 10 according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a satellite user terminal 24 typically includes an antenna dish 30 that is commonly referred to as an outdoor unit (ODU), and a device such as a set-top box or other type of equipment that is commonly referred to as an indoor unit (IDU) 32. The IDU 32 typically includes a transceiver 34, a controller 36, a memory 38, a local server 40 and other types of equipment (not shown) such as amplifiers, waveguides and so on as understood in the art on which enable communication between the satellite user terminal 24 and one or more gateways 12 via one or more of the orbiting satellites 14. A transceiver 34 can include, for example, an integrated satellite modem and any other suitable equipment which enables the transceiver 34 to communicate with one or more of the orbiting satellites 14 as understood in the art. The memory 38 can be, for example, an internal memory in the satellite user terminal 24, or other type of memory devices such as a flash memory or hard drives with external high speed interface such as a USB bus or an SATA bus, or remote memories such as cloud storage and so on. These other types of memory can be present at the satellite user terminal 24 or accessible at a location apart from the satellite user terminal 24 via a network connection such as an Ethernet connection, a WiFi connection or any other suitable type of connection as understood in the art.

As with the controller 20 for a gateway 12, the controller 36 preferably includes a microcomputer with a control program that controls the satellite user terminal 24 as discussed herein. The controller 36 can also include other conventional components such as an input interface circuit, an output interface circuit, and storage devices such as a ROM (Read Only Memory) device and a RAM (Random Access Memory) device. The RAM and ROM store processing results and control programs that are run by the controller 36. The controller 36 is operatively coupled to the components of the satellite user terminal 24 as appropriate, in a conventional manner. It will be apparent to those skilled in the art from this disclosure that the precise structure and algorithms for the controller 36 can be any combination of hardware and software that will carry out the functions of the present invention.

The memory 38 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Also, the local server 40 can communicate with an access point 42, such as a WAP or any other suitable device, which enables the local server 40 to provide packets to end user devices 44 as discussed herein. Such end user devices 44 include, for example, desktop computers, laptop or notebook computers, tablets (e.g., iPads), smart phones, Smart TVs and any other suitable devices as understood in the art. Naturally, the communications between the local server 38, the access point 42 and the end user devices 44 can occur over wireless connections, such as WiFi connections, as well as wired connections as understood in the art.

FIGS. 2-10 illustrate examples of operations and features associated with a user terminal installation process according to disclosed embodiments. In a typical installation process, the installer at the end-user site uses a location determining device, such as a GPS device, to determine the location of the satellite terminal. However, the installation process according to the disclosed embodiments provides an IDU 32 having a memory 38 into which has been stored satellite terminal installation data that is accessible by a code. As discussed in more detail below, the stored satellite terminal installation data includes, among other things, a database of "spreadsheets" for all of the user beams (UBs) and their respective virtual beams (VBs) generated by the satellite communication network 10 in relation to corresponding locations, such as latitude and longitude, on the surface of the earth. Thus, the database matches virtual beams to location data. That is, database matches each of the virtual beams to the respective latitudes and longitudes of coverage areas on the surface of the earth that are provided by the respective virtual beams.

Figure 2:
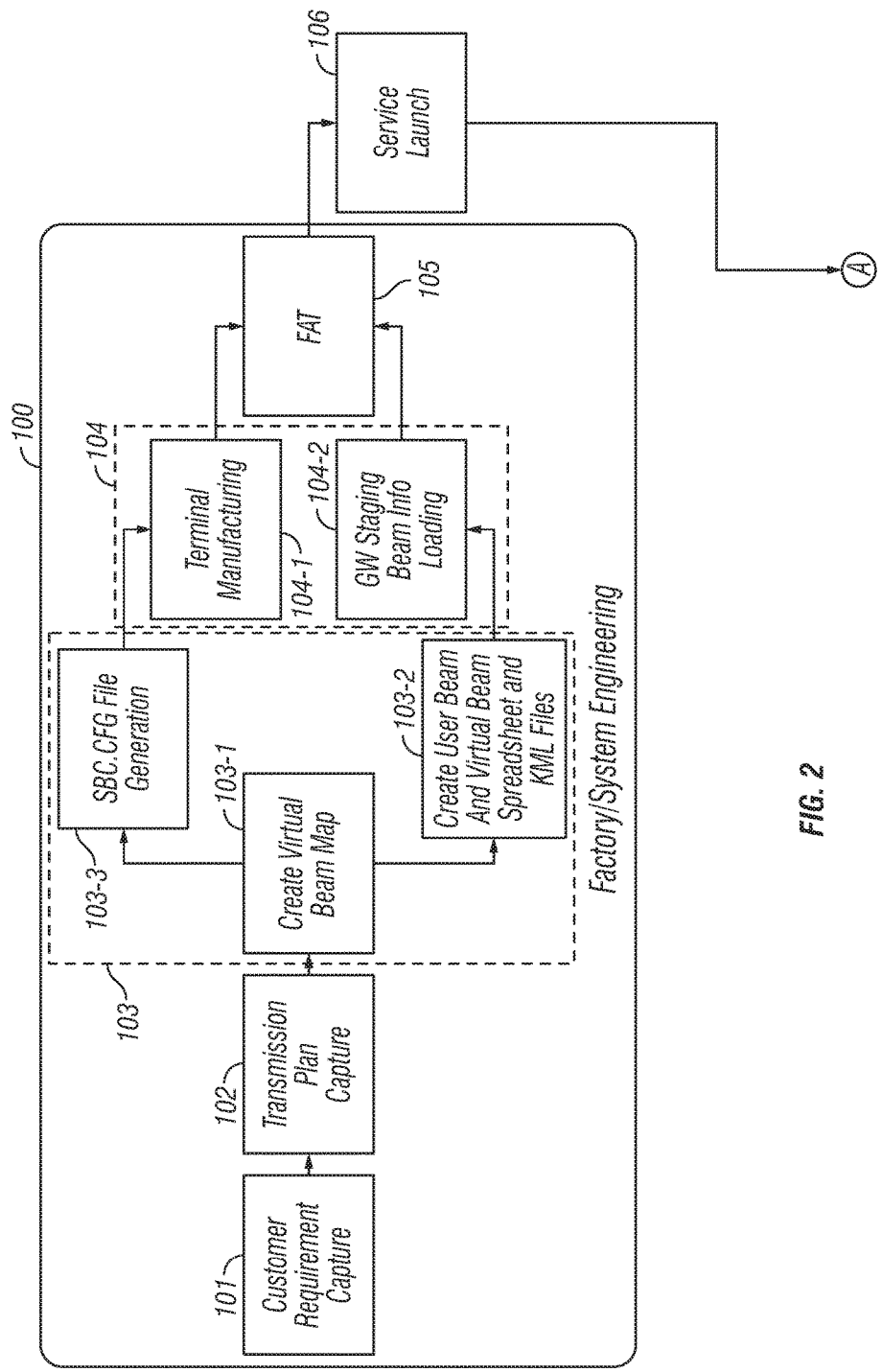
FIG. 2 is a conceptual flow diagram illustrating an example of operations associated with a terminal installation process according to a disclosed embodiment.
Figure 2:
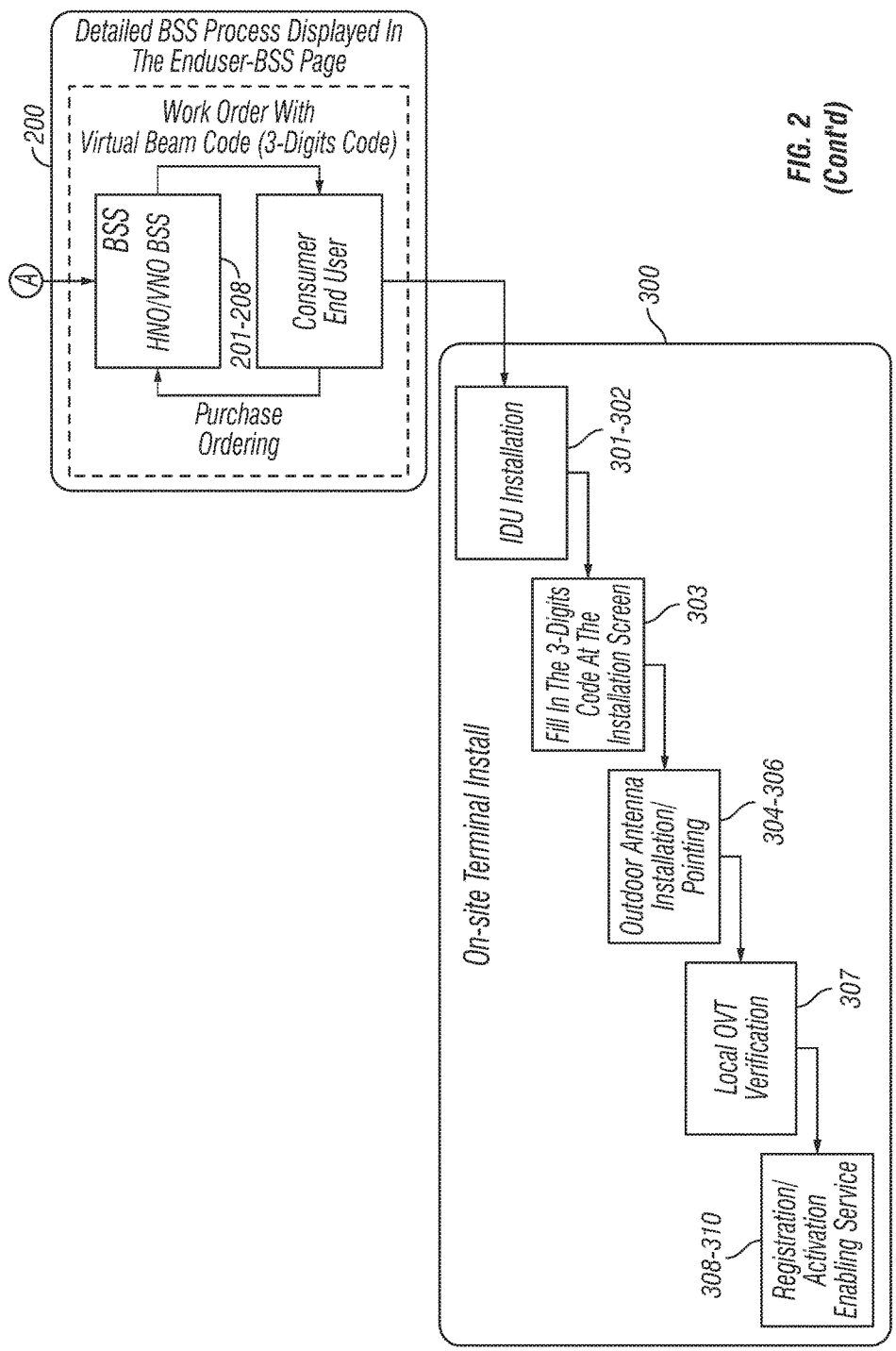
Figure 3:
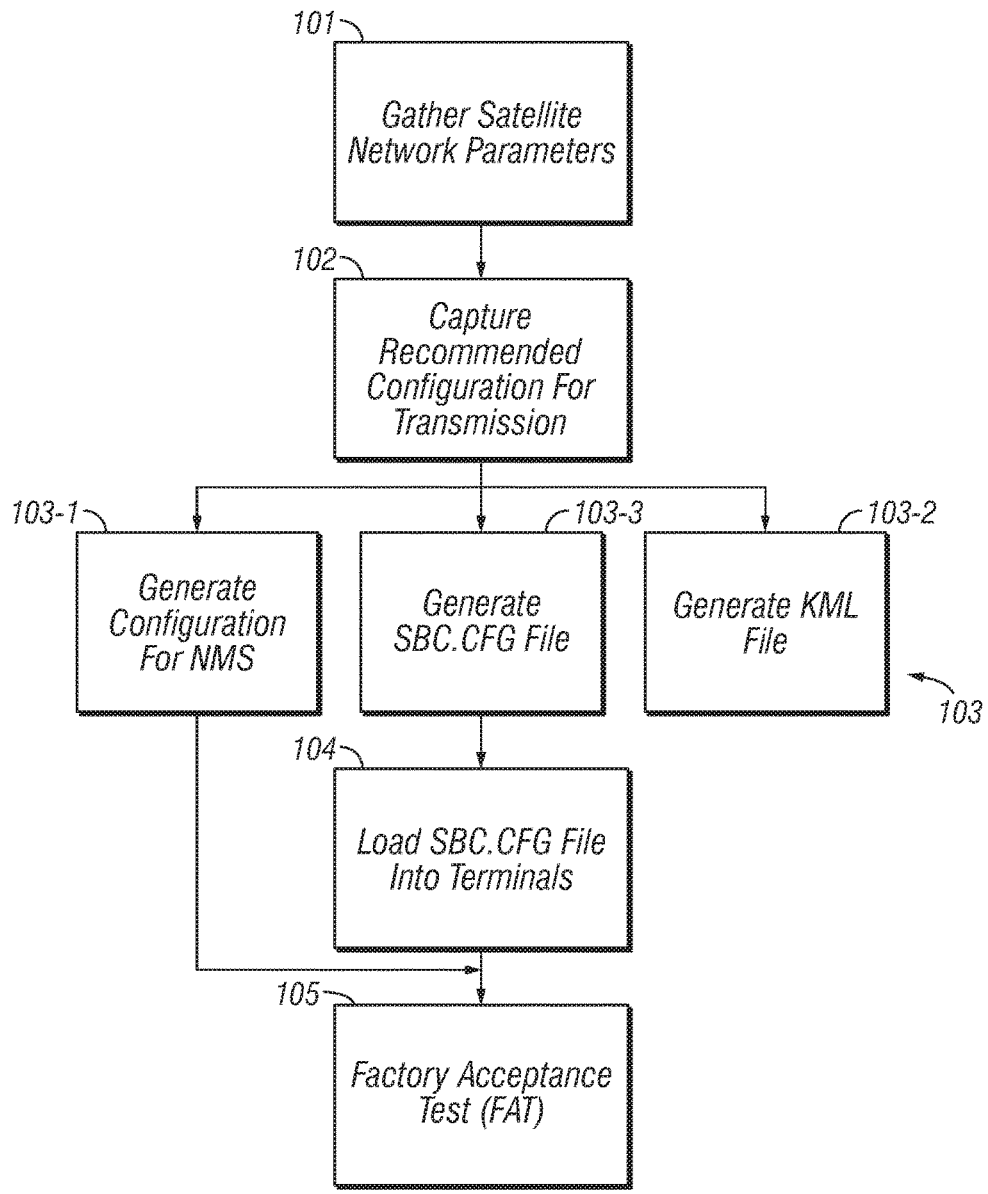
FIG. 3 is a flow chart illustrating an example of operations performed during the equipment manufacturing phase shown in FIG. 2.

As can be appreciated from the exemplary flow diagram shown in FIG. 2 and the flowchart of FIG. 3, the process according to a disclosed embodiment includes three phases, namely, the equipment manufacturing phase 100, the business support system phase 200 and the on-site terminal installation phase 300. Each of these phases will now be described.

During operation 101, information based on the network service provider (NSP) and the world wide (WW) virtual network operator (VNO) is captured for the satellite communication network 10 in any suitable manner as understood in the art. The information includes, for example, coordinates of the respective beam center and respective beam radii for each user beam, along with the respective coverage areas for each NSP and WW VNO that are mapped to the user beams. The information further includes information pertaining to a minimum number of virtual beams for each user beam radii to provide precise enough location info in order for a terminal 24 to acquire access to the satellite communication network 10 via, for example, large aperture bootstrap aloha for ranging which can be based upon TDMA closed-loop timing analysis, or any other suitable type of ranging, as understood in the art.

Figure 4:
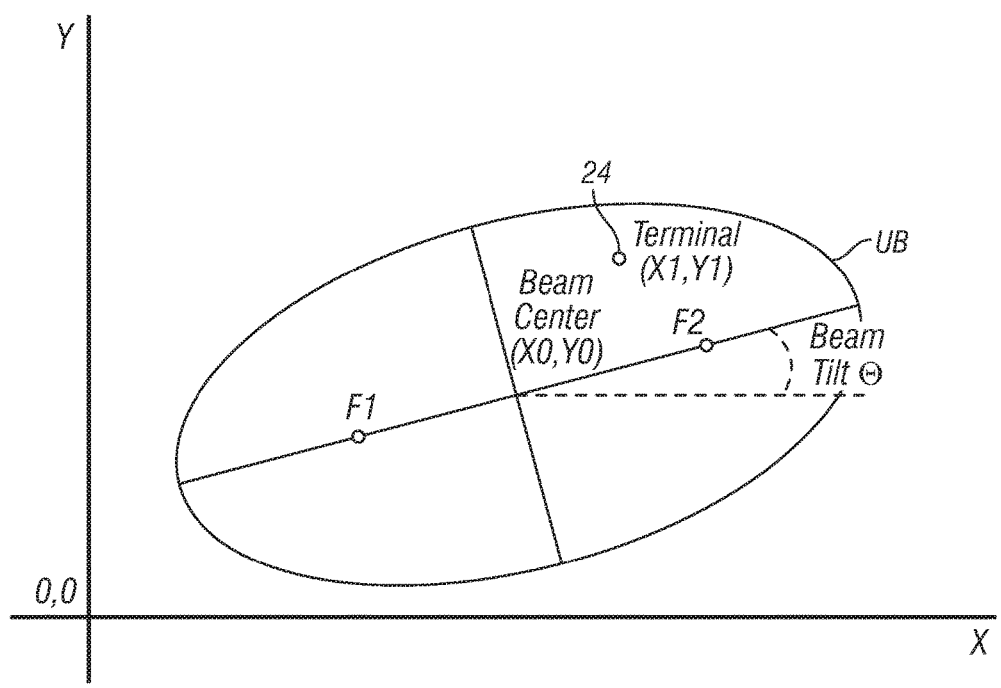
FIG. 4 illustrates an example of a user beam generated by a satellite in the satellite communication network shown in FIG. 1.

For example, as shown in FIG. 4, each user beam UB is typically shaped as an ellipse with a major axis and a minor axis of different lengths. The ellipses can also be rotated with respect to an X-Y coordinate system as understood in the art. Each user beam UB includes a set of virtual beams VB as shown, for example, in FIG. 5. A virtual beam can have, for example, a radius that is small enough to acquire an aloha TDMA timeslot of 1 msec size, or any other suitable size as understood in the art. A union of the virtual beams VB of a user beam UB define the coverage area for a single user beam UB. The user beams UB and their respective virtual beams VB can be arranged in a best fit manner to provide a coverage area for the terminals 34 as understood in the art.

During operation 102, information pertaining to the configuration for transmission for each IDU 32 in the satellite communication network 10 is captured in any suitable manner as understood in the art.

During operation 103, the database including the spreadsheets for each of the virtual beams captured during operations 101 and 102 as discussed above is created. In this example, operation 103 includes three sub-operations 103-1, 103-2 and 103-3. During operation 103-1 a virtual beam map is created for all of the virtual beams VBs. As part of that virtual beam map, during operation 103-2, a respective unique install code for each virtual beam VB is entered in the respective spreadsheet for each virtual beam VB. The spreadsheets can include or be associated with keyhole markup language (KML) files as understood in the art.

In the examples discussed herein, an install code is a three-character code. However, the install code can be of any suitable length or configuration in order to enable an installer to access the installation information as discussed herein. In the examples discussed herein, each install code is a three-digit alpha numeric value. In order to avoid confusion at the installation site by the installer, each install code should avoid the number 0, upper case letter O, and lower case letter o since they can be easily confused on a printed label. For similar reasons, each install code should also should avoid number 1, upper case letter I, and lower case letter l since they can be easily confused on a printed label. Likewise, each install code should avoid upper case Q and upper case O if upper case is used since they can be easily confused on a printed label. Furthermore, each install code should avoid special characters (non-alpha, non-numeric) for ease of entry by the installer, and should avoid lower case characters and only use upper case characters to avoid incorrect data entry by the installer.

Figure 5:
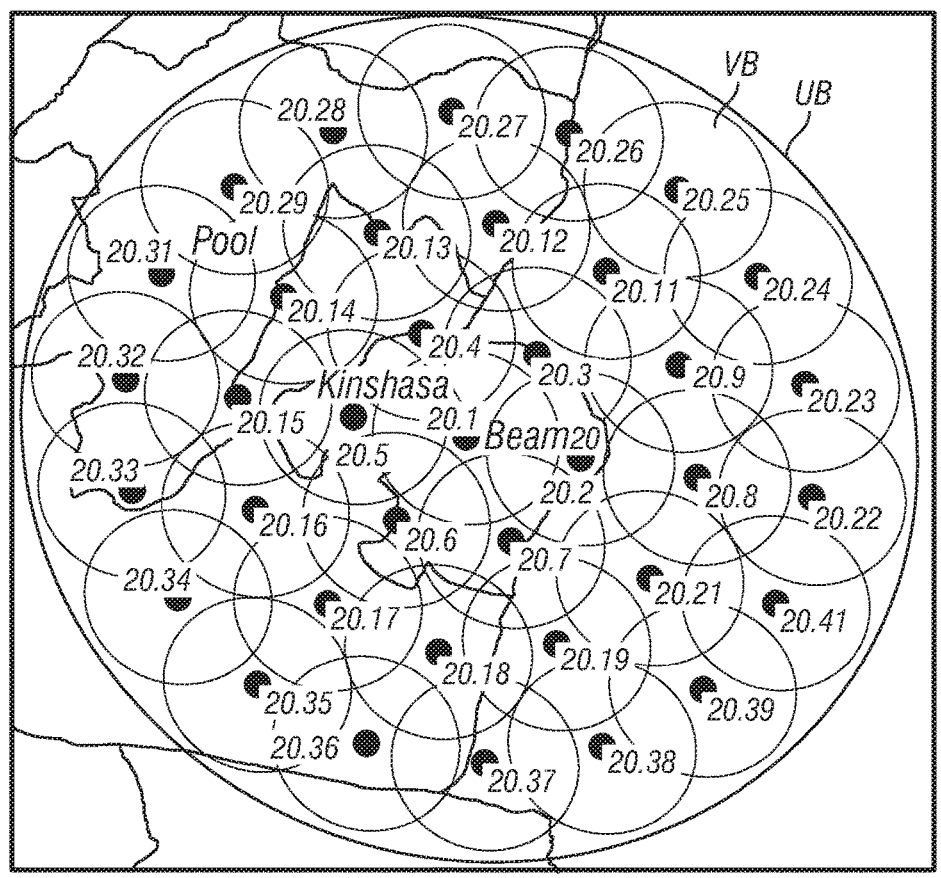
FIG. 5 illustrates an example of virtual beams included in a user beam such as that shown in FIG. 4.

Table 1 below is an example of three-character install codes associated with the virtual beams shown in FIG. 5.

TABLE 1

| Virtual_Beam_ID | Parent Beam Location | Install_Code |
| --- | --- | --- |
| 20.1 | Kinshasa | A55 |
| 20.2 | Kinshasa | KFS |
| 20.3 | Kinshasa | 5CT |
| 20.4 | Kinshasa | 739 |
| 20.5 | Kinshasa | MK6 |
| 20.6 | Kinshasa | 3FR |
| 20.7 | Kinshasa | YCR |
| 20.8 | Kinshasa | FL5 |
| 20.9 | Kinshasa | WBZ |
| 20.11 | Kinshasa | VZA |
| 20.12 | Kinshasa | U79 |
| 20.13 | Kinshasa | 4ML |

TABLE 1-continued

| Virtual_Beam_ID | Parent Beam Location | Install_Code |
| --- | --- | --- |
| 20.14 | Kinshasa | JWR |
| 20.15 | Kinshasa | F45 |
| 20.16 | Kinshasa | 2R4 |
| 20.17 | Kinshasa | BPH |
| 20.18 | Kinshasa | DJX |
| 20.19 | Kinshasa | TJP |

The respective virtual beam spreadsheet for each respective virtual beam can include other information such as the virtual beam id, parent beam id, virtual beam center azimuth, virtual beam center elevation, beam radius, beam owner, parent beam state, virtual beam state, parent beam location, beam type and so on. This information matches the sbc.cfg file (satellite broadcast communication configuration file) that is created during operation 103-1.

Figure 6:
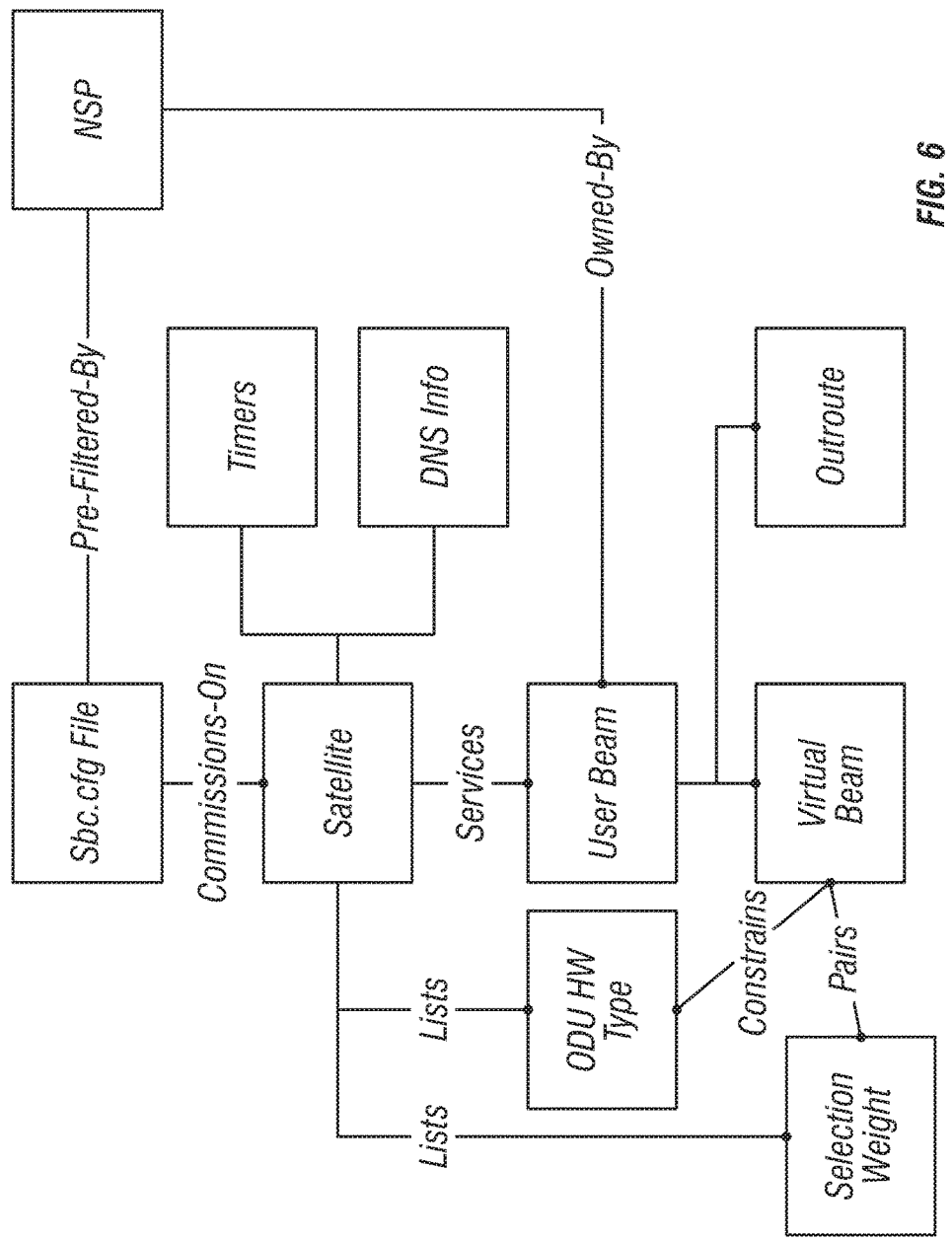
FIG. 6 is a conceptual block diagram illustrating an example of a satellite broadcast communication configuration file created during the equipment manufacturing phase shown in FIG. 2.

As shown in FIG. 6, the sbc.cfg files include information pertaining to the network service provider, the satellites 14 in the satellite communication network 10, the domain name system (DNS) and timers, the outdoor units (ODU) and their types of hardware such as antenna size (e.g., a 74 cm antenna, a 98 cm antenna or a 120 cm antenna), RF power (e.g., 1 Watt RF or 2 Watt RF) and so on. The sbc.cfg can further include information pertaining to the user beams UBs, the virtual beams VBs and their outroutes, and the selection weights associated with the virtual beams as understood in the art.

During operation 104, the information created and generated during operation 103, including the information for the spreadsheets for each of the virtual beams captured during operations 101 and 102, is stored in the memory 38 of each of the IDUs 32. Operation 104 can include operation 104-1 during which the IDU 32 is manufactured, and operation 104-2 in which the sbc.cfg files and any of the other information created and generated during operation 103 are stored in the memory 38 of each of the IDUs 32. Thus, data pertaining to all of the virtual beams VB and all of the install codes are stored in the memory 38 of each of the IDUs 32. Each IDU 32 is assigned a different part number to create WW VNO custom branded IDUs 32. Optionally, factory acceptance testing can be performed on each of the IDUs 32 in operation 105. The IDUs 32 are then ready for deployment to end users during the service operation 106 on as as-needed basis.

Figure 7:
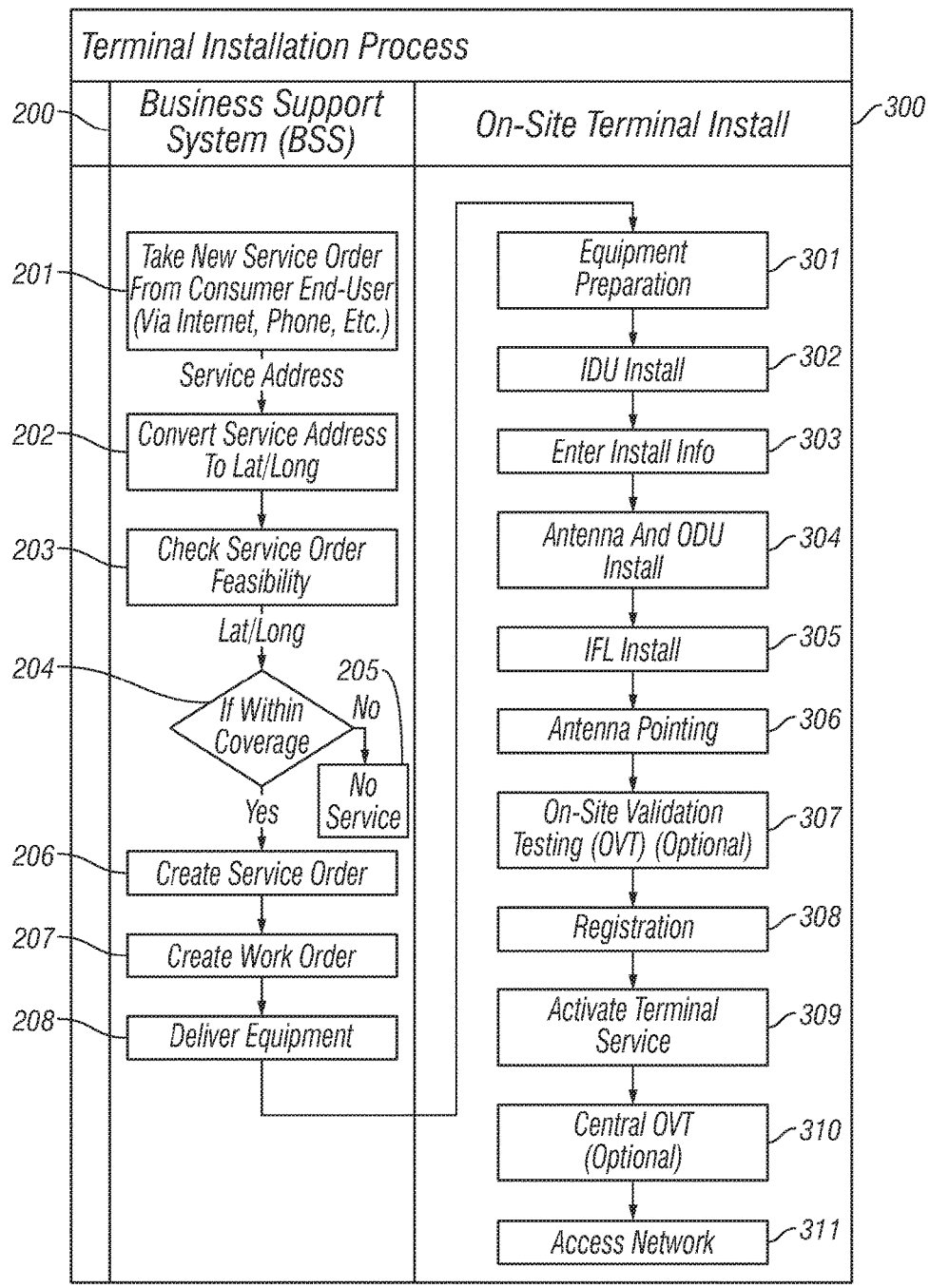
FIG. 7 is a flow chart illustrating an example of operations performed during the business support system phase and the on-site terminal installation phase shown in FIG. 2.
Figure 8:
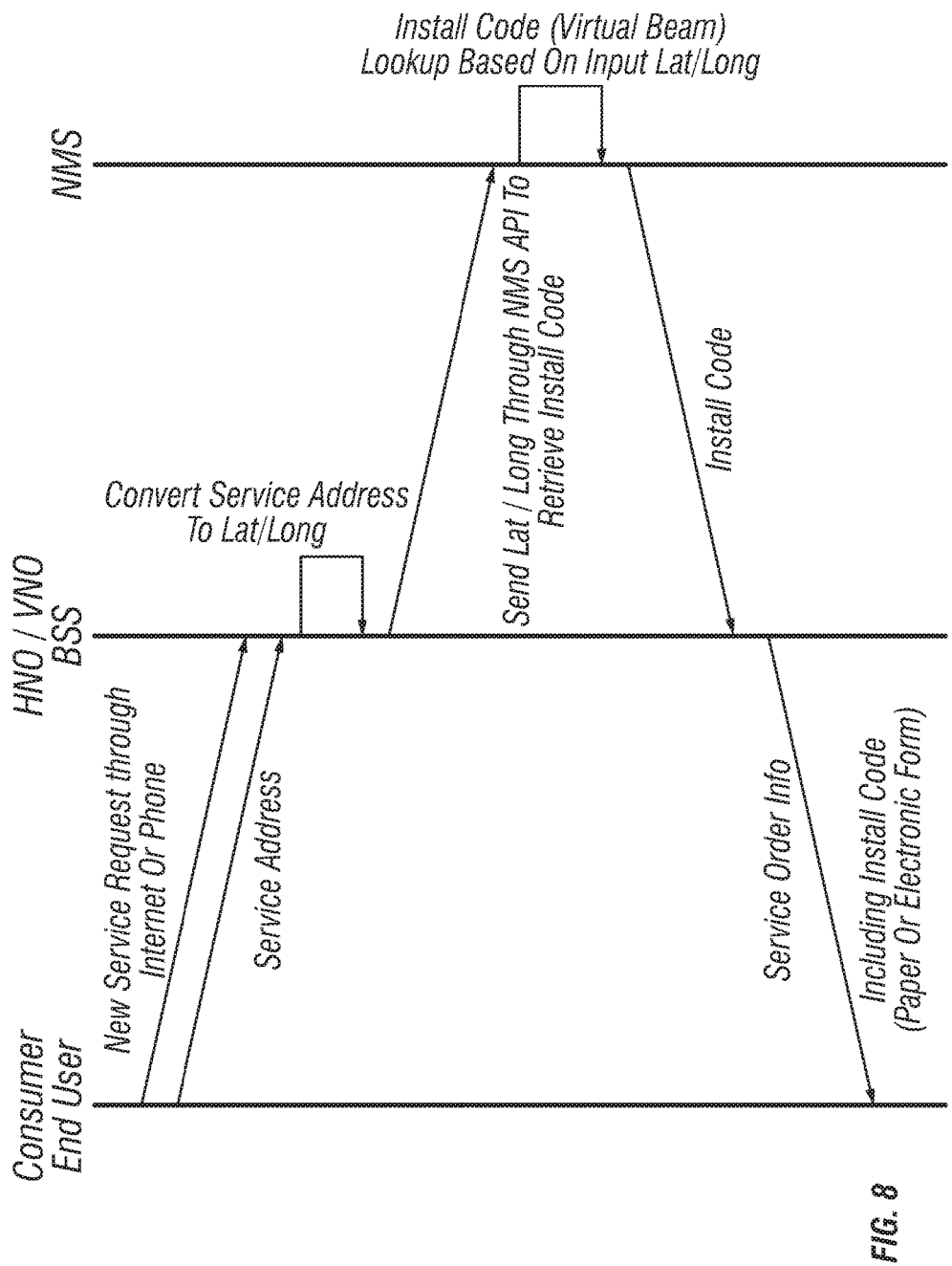
FIG. 8 is an exemplary flow diagram illustrating an example of operations performed during the business support system phase and the on-site terminal installation phase shown in FIGS. 2 and 7.
Figure 10:
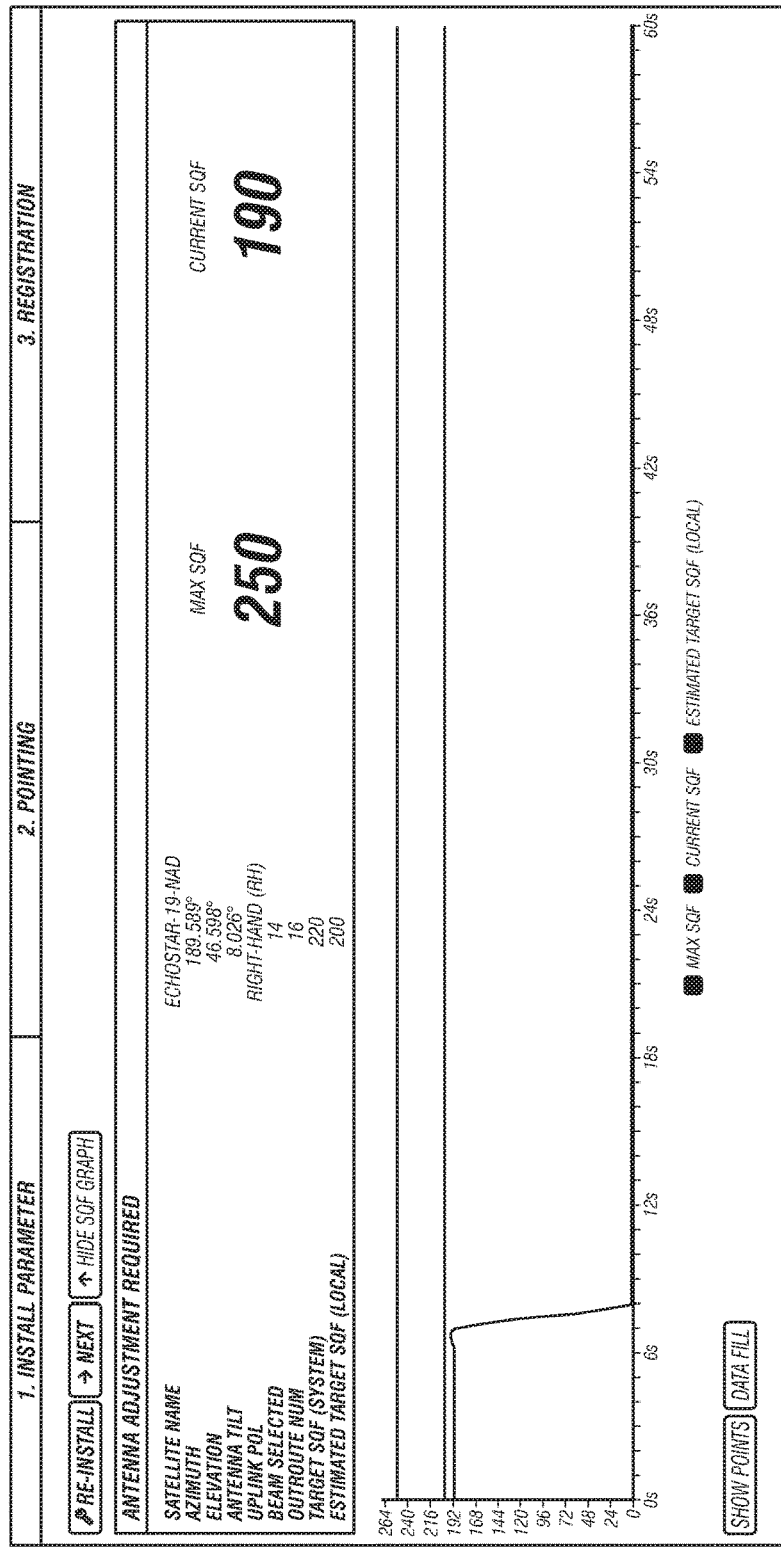
FIG. 10 illustrates an example of a display screen displaying testing information during testing operations performed in the on-site terminal installation phase as shown in FIGS. 2, 7 and 8.

Exemplary operations of the business support system phase 200 are shown in FIGS. 2, 7 and 8, when an end-user wishes to obtain service from the satellite communication network 100, the end-user contacts the business support system in step 201 to request installation of a terminal 24. An operator (the BSS operator) at the business support system can take the end-user's information via telephone, on-line or in any suitable manner. The end-user's information includes the address at which the terminal 24 is to be installed (the installation address), which can correspond to the end-user's address.

During step 202, the BSS operator converts the installation address into longitude and latitude coordinates using, for example, Google Maps, Google Earth or any other suitable software or application. For example, the BSS operator can us the Google Map API to convert the street address of the installation address into latitude and longitude. The BSS operator can also use the Google Earth GUI to locate the street address to determine its latitude and longitude, or some similar map application that provides latitude and longitude as understood in the art. In addition, the BSS operator can update the information stored in the memory 38 of a terminal 24, such as information pertaining to additional user beams and virtual beams in additional service areas, and so on as understood in the art.

In step 203, the BSS operator determines whether a terminal 24 can be deployed and will operate at the installation address. For instance, the BSS Operator enters the selected NSP or WW VNO into a database of virtual beams to filter the list of available virtual beams at that installation address. If the BSS operator determines in step 204 that the installation address fails to lie within any of the user beams, then service is unavailable at that installation address. In this case, the BSS operator informs the end-user that service is not available in step 205. However, if service is available at the installation address, the BSS operator will create a service order in step 206.

To create the service order, the BSS operator can use, for example, an NMS-provided web-based API to convert the latitude and longitude into a selected VB and its install code. The BSS operator includes the install code in the service order and provides this install code to the end-user and/or to the installer of the terminal 24 in any suitable manner. Naturally, the end-user can be the person who will install the terminal 24. For instance, the BSS operator can provide the install code as a printed code on the service order sent to the end-user or installer with the terminal 24. The BSS operator can send the install code to the end user and/or installer via email, via online access, via a text message or voice message, or in any other suitable manner.

In step 207, the BSS operator creates a work order. In step 208, the BSS operator has the terminal 24 delivered to the end-user, which could be the installer, or to the installer.

Exemplary embodiments of the on-site terminal installation phase 300 are shown in FIGS. 2, 7 and 8. In step 301, the installer prepare the equipment of the terminal 24. In step 302, the installer installs the IDU 32 and powers up the IDU 32. The installer uses a user interface, such as any of the type of end user devices 44 discussed above, to access the installation information stored in the memory 38 of the terminal 24 as discussed above. In particular, in step 303, the user uses an end user device 44 to enter the install code. For example, as shown in FIG. 9, the end user device 44 can display a window W on its graphical user interface into which the installer can enter the install code (e.g., ZZZ). If the install code is invalid or incorrectly entered, the end user device 44 can display an error message in the window W, and the installer can try to reenter the code or contact the business support system (BSS) if failures continue.

In response to a properly entered access code, the controller 36 access the installation information from the memory 38, and that information is, for example, displayed on the end user device 44. Thus, the controller 36 of the terminal 24 converts the install code based upon, for example, its sbc.cfg into a selected virtual beam. The terminal 24 informs the installer via the end user device 44 of the installation information for the dish 30, including azimuth, elevation, tilt, polarization for the selected virtual beam center, which is converted by the terminal 24 into latitude and longitude used by the terminal as part of its terminal ranging, commissioning, registration, and swaps.

The installer uses this installation information to install the dish 30 and angle the dish appropriately in steps 304, 305 and 306. For example, the installer can mount the dish in step 304. In step 305, the installer can install the interfacility link (IFL), such as the cable between the ODU and the IDU. In step 306, the installer can point the dish 30 at the appropriate elevation and angle as understood in the art. The user can follow the instruction indicated in the window W displayed by the end user device 44 by clicking on the appropriate buttons (e.g., "next," etc.) and dropdown menus.

Examples of the type of information that can be displayed are shown in Tables 2 and 3 below. In Table 2, the Target and Estimated SQF values are displayed since the local on-site verification tool (OVT) is enabled. In Table 3, the Target and Estimated SQRF values are not displayed since the local OVT is disabled. Naturally, the amount of information and the manner in which the information is displayed can be programmed into the terminal 24 during the equipment manufacturing phase 100 as discussed above and/or during updating in the business support system phase 200.

TABLE 2

| Satellite Name | EchoStar-19-NAD |
|---|---|
| Azimuth | 189.589° |
| Elevation | 46.598° |
| Antenna Tilt | 8.026° |
| Uplink Pol | Right-Hand (RH) |
| Beam Selected | 14 |
| Outroute Num | 16 |
| Target SQF (System) | 220 |
| Estimated Target SQF (Local) | 180 |

TABLE 3

| Satellite Name | EchoStar-19-NAD |
|---|---|
| Azimuth | 189.589° |
| Elevation | 46.598° |
| Antenna Tilt | 8.026° |
| Uplink Pol | Right-Hand (RH) |
| Beam Selected | 14 |
| Outroute Num | 16 |

In step 307, which is optional, the installer can perform verification operations as understood in the art. For example, the terminal 24 can acquire a system information message containing the required minimum signal strength value for the given user beam's center. The terminal 24 extrapolates its required signal strength value based upon its virtual beam center's distance from the user beam's center. The installer can performs antenna pointing operations either using a DAPT connected inline of the IFL at the ODU which provides a good/bad indicator to the installer if the signal strength meets its required minimum, or using a WiFi enabled device with a web browser to connect via WiFi to reach the terminal IDU 32 which shows signal strength values on its Web UI with the WiFi being provided by either a separate installer-provided WiFi router with a wired connection to the terminal IDU 32 or an integrated WiFi router built into the terminal IDU 32. The installer performs antenna pointing to maximize the signal strength based upon this given feedback of signal strength values as they adjust the terminal antenna.

If the installation is unsuccessful, the installer can be instructed by the information displayed by the end user device 44 to perform any or all of the operations 304, 305 and 306 again, and repeat the validation testing in step 307. Once the testing is successful, the installer performs registration operations in step 308 to register the terminal 24. At the end of the terminal's registration, the terminal 24 provides its transmit and receive related EsNo readings, antenna size and radio wattage data to the test center, and based on the terminal's relative location to the center of the user beam, and the OVT test suite normalizes the thresholds and values in a manner consistent with the result of the calculation performed during the antenna pointing process.

The installer then activates the service in step 309. In addition, in step 310 which is optional, the installer may optionally perform, based upon the business processes defined by the NSP, a centralized OVT in order to get a signoff code for the installation. For instance, the installer can click on the URL link on the end user device 44 to navigate to the centralized OVT's web page. The centralized OVT collects actual install info from the terminal 24 to determine if the installation meets required value ranges for a successful install. The centralized OVT provides a sign off code to the installer for a successful install. While the testing is being performed, the GUI of the end user device 44 can display information pertaining to the testing as shown, for example, in FIG. 10. For instance, the installer can update the local OVT mandatory optional field by, for example, selecting a dropdown menu. The terminal 24 can acquire this message and normalize the downlink EsNo value to at least meet the minimum threshold to pass the antenna pointing process. Alternatively, the controller 36 in the terminal 24 can still calculate the normalized downlink EsNo value, whether the EsNo value meets the threshold value or not, the operator can always move to the next page of installation.

Once the installation and OVT operations are complete, the end-user can then begin accessing the satellite communication network 10 in step 311 to, for example, browse the Internet and so on.

As can be appreciated from the above, the method and system according to the disclosed embodiments requires no use of GPS or any other location determining services during the installation of the terminal 24. The embodiments also improve the usability of the software in the terminal 24 by reducing the number of parameters required during the installation, which in turn reduces the possibilities of satellite beam info selection error and terminal location errors caused by human error. Thus, the installation process is simplified since it is unnecessary for detailed messages displayed on the graphical user interface of the end user device 44 being used by the installer, and instead, more effective and detailed antenna pointing guidelines are displayed. Moreover, the embodiments are able to support GPS-less installation with a location error up to 40 KM. Each terminal will be assigned with a 3-digit alpha-numerical install code. Also introduced a new mechanism to provide better antenna pointing guide lines during installation.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for installing a terrestrial antenna for a satellite communication network, the method comprising:
provide a remote unit to an installation location for the terrestrial antenna, the remote unit being configured to communicate with a satellite of the satellite communication network and including a memory in which is stored antenna information pertaining to positioning of the terrestrial antenna with respect to a virtual beam generated by the satellite, the antenna information being accessible by entering a code that is associated with the virtual beam generated by the satellite;
accessing the antenna information from the memory at the installation location using the code; and
positioning the terrestrial antenna in relation to a virtual beam generated by the satellite based on the antenna information accessed from the memory at the installation location.

2. The method according to claim 1, wherein
the accessing comprises operating a user interface to enter the code and display the antenna information accessed from the memory.

3. A method for installing a terrestrial antenna for a satellite communication network, the method comprising:
providing a remote unit to an installation location for the terrestrial antenna, the remote unit being configured to communicate with a satellite of the satellite communication network and including a memory in which is stored antenna information pertaining to positioning of the terrestrial antenna with respect to a virtual beam generated by the satellite, the information being accessible by a code;
accessing the antenna information from the memory at the installation location using the code; and positioning the terrestrial antenna in relation to a virtual beam generated by the satellite based on the antenna information accessed from the memory at the installation location, the accessing comprising operating a user interface to enter the code and display the antenna information accessed from the memory, and the positioning comprising pointing the terrestrial antenna in a first pointing direction based on the antenna information; and performing a verification operation using the user interface to verify whether the terrestrial antenna pointing in the first pointing direction meets a predetermined condition.

4. The method according to claim 3, wherein the positioning further comprises maintaining the terrestrial antenna in the first pointing direction when the verification operation indicates that the terrestrial antenna pointing in the first pointing direction meets the predetermined condition; and adjusting the terrestrial antenna to point in a second pointing direction when the verification operation indicates that the terrestrial antenna pointing in the first pointing direction fails to meet the predetermined condition.

5. The method according to claim 3, wherein the performing a verification operation includes performing communication between the remote unit and the satellite and determining whether the communication meets a predetermined condition.

6. The method according to claim 1, wherein the providing includes storing in the memory a plurality of sets of antenna information, each of the sets of antenna information being accessible by a respective code and including information pertaining to positioning of the terrestrial antenna with respect to a respective virtual beam generated by the satellite.

7. The method according to claim 6, wherein the accessing comprises operating a user interface to enter the code to cause the remote unit to select one of the sets of antenna information that corresponds to the code, and operating the user interface to display the selected antenna information.

8. The method according to claim 1, wherein the terrestrial antenna includes a satellite dish; and the pointing includes pointing the satellite dish in a first pointing direction based on the antenna information.

\* \* \* \* \*